US010757079B2

(12) United States Patent
Schmidt et al.

(10) Patent No.: US 10,757,079 B2
(45) Date of Patent: *Aug. 25, 2020

(54) METHOD AND SYSTEM FOR CONTROLLING REMOTE SESSION ON COMPUTER SYSTEMS USING A VIRTUAL CHANNEL

(71) Applicants: Jens Schmidt, Osterholz-Scharmbeck (DE); Sascha Goeckel, Gross-Bieberau (DE); Jonathan Allsop, Chester (GB)

(72) Inventors: Jens Schmidt, Osterholz-Scharmbeck (DE); Sascha Goeckel, Gross-Bieberau (DE); Jonathan Allsop, Chester (GB)

( * ) Notice: Subject to any disclaimer, the term of this patent is extended or adjusted under 35 U.S.C. 154(b) by 655 days.

This patent is subject to a terminal disclaimer.

(21) Appl. No.: 14/993,605

(22) Filed: Jan. 12, 2016

(65) Prior Publication Data

US 2017/0201491 A1    Jul. 13, 2017

(51) Int. Cl.
*H04L 29/06*        (2006.01)
*H04L 29/08*        (2006.01)

(52) U.S. Cl.
CPC .......... *H04L 63/0272* (2013.01); *H04L 63/08* (2013.01); *H04L 63/102* (2013.01); *H04L 65/1069* (2013.01); *H04L 67/08* (2013.01)

(58) Field of Classification Search
CPC ... H04L 63/0272; H04L 63/102; H04L 63/08; H04L 67/08; H04L 65/1069; H04L 12/4641
See application file for complete search history.

(56) References Cited

U.S. PATENT DOCUMENTS

| 8,972,485 | B1 * | 3/2015 | French | G06F 9/5044 |
| | | | | 709/203 |
| 9,716,740 | B2 * | 7/2017 | Fausak | H04L 67/40 |
| 9,729,551 | B1 * | 8/2017 | Karunakaran | H04L 51/22 |
| 10,074,227 | B1 * | 9/2018 | Berenberg | G07C 9/00571 |
| 10,079,875 | B2 * | 9/2018 | Zamir | H04L 67/025 |
| 2007/0050471 | A1 * | 3/2007 | Patel | G06F 9/54 |
| | | | | 709/217 |
| 2008/0235361 | A1 * | 9/2008 | Crosbie | G06F 9/5027 |
| | | | | 709/223 |
| 2010/0064215 | A1 * | 3/2010 | Portman | G06F 3/14 |
| | | | | 715/704 |
| 2011/0219122 | A1 * | 9/2011 | Mahajan | G06F 15/16 |
| | | | | 709/227 |

(Continued)

*Primary Examiner* — Lynn D Feild
*Assistant Examiner* — Abdullah Almamun
(74) *Attorney, Agent, or Firm* — Gerard Hespos; Michael Porco; Matthew Hespos

(57) ABSTRACT

Method and devices are provided for controlling access of a device to a remote desktop or a remote application running on a remote desktop or application server using a remoting protocol. The method includes the following steps: setting up a connection between the device and the remote desktop or application server to establish or to an existing user session, using the remoting protocol; setting up a virtual channel within the connection using the remoting protocol; monitoring the device to determine a device state; sending the device state over the virtual channel to the application server; and determining based on the received device state if an access to the remote desktop or remote application running in the user session is allowed, and blocking the access if the access is due to the received state not allowed.

20 Claims, 6 Drawing Sheets

(56) References Cited

U.S. PATENT DOCUMENTS

| | | | | |
|---|---|---|---|---|
| 2011/0243433 A1* | 10/2011 | Fagg | ............ | G06K 9/36 |
| | | | | 382/165 |
| 2011/0276699 A1* | 11/2011 | Pedersen | ............ | H04L 45/24 |
| | | | | 709/227 |
| 2012/0136917 A1* | 5/2012 | Abramson | ............ | G06F 9/543 |
| | | | | 709/203 |
| 2012/0230345 A1* | 9/2012 | Ovsiannikov | ............ | H04L 47/2441 |
| | | | | 370/412 |
| 2012/0303762 A1* | 11/2012 | Geiser | ............ | G06F 9/4416 |
| | | | | 709/219 |
| 2012/0331032 A1* | 12/2012 | Balachandran | ............ | H04L 69/164 |
| | | | | 709/202 |
| 2013/0054787 A1* | 2/2013 | Ponsford | ............ | H04L 43/0858 |
| | | | | 709/224 |
| 2014/0047560 A1* | 2/2014 | Meyer | ............ | G06F 21/62 |
| | | | | 726/28 |
| 2014/0289639 A1* | 9/2014 | Halim | ............ | G06F 1/3203 |
| | | | | 715/740 |
| 2014/0295821 A1* | 10/2014 | Qureshi | ............ | H04L 43/04 |
| | | | | 455/419 |
| 2015/0271027 A1* | 9/2015 | Goldberg | ............ | H04L 65/403 |
| | | | | 715/740 |
| 2015/0365439 A1* | 12/2015 | Liverance | ............ | H04L 63/0823 |
| | | | | 726/1 |
| 2016/0234343 A1* | 8/2016 | Fausak | ............ | H04L 12/4679 |
| 2016/0286003 A1* | 9/2016 | Pessis | ............ | H04L 67/42 |
| 2016/0371104 A1* | 12/2016 | Zamir | ............ | G06F 9/45533 |
| 2016/0380860 A1* | 12/2016 | Singhal | ............ | H04L 43/0864 |
| | | | | 709/224 |
| 2017/0116009 A1* | 4/2017 | Zamir | ............ | G06F 9/45533 |
| 2018/0062936 A1* | 3/2018 | Poe | ............ | H04L 29/06 |
| 2019/0132381 A1* | 5/2019 | Momchilov | ............ | G06F 3/1454 |

* cited by examiner

METHOD AND SYSTEM FOR CONTROLLING REMOTE SESSION ON COMPUTER SYSTEMS USING A VIRTUAL CHANNEL

BACKGROUND

1. Field of the Invention

This invention is direct to a method and device to control user session as it connects to a remote desktop or application, using a Virtual Channel supplied by the remoting technology such as Remote Desktop Protocol (RDP), Citrix Independent Computing Architecture (ICA) or VMware PC-over-IP (PCoIP). Further, the invention continues to monitor the state of the device, operating system and user session for as long as it is connected to the remote desktop or application.

2. Description of the Related Art

In the following a general term definition is provided and is used within the application documents:

Device—A laptop, physical desktop, thin client, tablet, mobile phone used by a user such as an employee, contractor or supplier to connect to a remote desktop or remote application.

Thin Client—A corporate owned physical desktop dedicated to accessing a remote desktops or remote applications.

Connected Device—Same as device, although with emphasis on the fact that the device is connected to the remote desktop or application.

Connecting Device—Same as device, although the device is actively establishing a connection with the remote desktop or application.

Device State—The state of the device, including the state of the physical device, the operating system which runs on it, and the logged in user session. The state can be defined by one or more of the following parameters: Anti-Virus enabled, Firewall enabled, Wi-Fi connectivity/security, Installed Applications, Running Applications, User Security, Group membership, User Privileges, Geographical Location, Geographical Elevation, and others.

Remote Desktop—A Windows (or other) desktop, running on a server within a corporate data center or on the internet (cloud), allowing user to launch one or more applications which run within a remote user session and is delivered via a remoting protocol to a device.

Remote Application—A single Windows (or other) application, offering a user interface that runs in a remote session and is delivered via a remoting protocol to a device. In comparison to the remote desktop only the relevant application data is transmitted and not the complete desktop, so that the application although running remote is integrated into the local desktop.

Access Token—An access token is an Operating System concept that describes the security context of an application, and determines the access that the operating system grants to the process. The access token consists of a set of security groups, privileges and claims which the operating system uses to control access to securable objects, such as files and folders and the Windows Registry. This Access Token is also used by the invention to control the access.

Remote Desktop or Application Server—A server, either physical or virtual, that is configured to allow remote access to either the desktop or one or more applications.

Remoting Protocol—A network protocol used to capture graphics, audio, clipboard or storage from a remote session and deliver it to a device where it can be reconstructed to give the illusion that the remote desktop or application is running on the local device.

Remoting Protocol Service—An application launched by the Operating System and that implements the server side of the Remoting Protocol.

Gateway Server—A server that facilitates the connection between the Connecting Device and the Remote Desktop or Application Server. The gateway server may choose to allow or deny the connection based upon the configuration. It may also connect the network of the Connecting Device to the Remote Desktop or Application Server using technologies such as a Virtual Private Network (VPN).

Virtual Channel—Provided by the remoting protocol, the virtual channel allows third parties (or the remoting protocol vendor) to implement communicate between software running on the remoting client and software running on the remote desktop server.

Remoting Client—An application that runs on a device, implementing the client end of the remoting protocol and presents to the user either a remote desktop or remote application.

User Session—An abstract concept of an operating system to represent an authenticated and logged in user, their desktop, and the applications that they are running either on virtual desktop or virtual machine providing a virtual desktop.

Remote User Session—A user session running on a remote computer, and is delivered over the internet or intranet by communications using a remoting protocol. In contrast to that is the local session when the user is logged into the user session with the keyboard, mouse and monitor physically connected to the remote desktop or application server.

Windows Registry—A hierarchical database of settings for the Microsoft Windows Operating System and Microsoft Windows applications.

Environment Variables—A set of name/value pairs that can affect the way applications run. Environment Variables can be global, or specific to a user or user session.

Administrative Scripts—Written in one of many high level programming languages, Administrative Scripts are written by IT departments to manipulate the behavior of the Operating System to increase the user experience, or to enforce corporate policy.

Third Party Tools—Much like the Administrative Scripts, a number of third party tools exist written by the OS vendor or independent software vendors, allowing IT departments to manipulate the behavior of the Operating System to increase the user experience, or to enforce corporate policy.

Operating System—Software that runs on a computer to manage computer hardware and software, and provide a common set of services to applications.

Internet—A global system of interconnected networks connecting billions of devices around the world.

Intranet—A private network accessible only to the employees of an organization.

Jailbroken—A jailbroken device is one that has been deliberately compromised to remove software restrictions enforced by the manufacturer, allowing applications to be run that are not available to a non-jailbroken device.

The increase in capability of portable devices, combined with the increase in availability of high speed internet has created an environment where employees now expect to be able to work from anywhere using a variety of devices. Those devices can be owned by the business, the employee or someone external. Therefore these devices are managed and maintained not exclusively by the own IT department but also by the employee itself or by the external user. These differently owned devices will have different statuses e.g. their security state (Anti-virus, Firewall etc.). All these devices will be used as connecting devices to connect to a corporate remote desktop or application hosted in the datacenter. To provide a compliant and secure corporate workspace, the IT department needs to consider the current status of the device connected to the corporate workspace.

Microsoft Remote Desktop Services is a widely used technology that allows users to access a remote desktop or application from either a session-based, or virtual desktop infrastructure-based server. In the following the term session is used for both session base or virtual desktop infrastructure based server. The server may be running on a data center within a corporate network, or from the internet. Users access the remote desktop or application using a Remote Desktop Client available on all mainstream devices including desktop platforms such as Windows and Mac OSX, and also mobile platforms such as Windows Phone, iOS, and Android. The Remote Desktop Client uses Remote Desktop Protocol (RDP) to deliver a high fidelity remoting experience, by transporting high quality graphics, audio, clipboard, storage and printers from the data center to the Remote Desktop Client. This ensures that as long as the user has connectivity to the data center, they can access their desktop or application from any device, and wherever they are physically located.

Citrix XenApp and XenDesktop is another widely adopted technology that aims to deliver both desktops and applications from the data center to the user. Citrix provides a Citrix Receiver product which delivers the remote desktop or applicate to a variety of devices, including desktop platforms such as Windows, Mac OSX, Linux and Chrome OS, and also mobile platforms such as Windows Phone, iOS, Android and Blackberry. Citrix Receiver uses the Citrix Independent Computing (ICA) remoting protocol to deliver high fidelity remoting experience to the user.

VMware Horizon is another adopted technology which aims to deliver both desktops and applications from the data center to the user. VMware provides a product which delivers the remote desktop or applicate to a variety of devices, including desktop platforms such as Windows, Mac OSX, Linux and Chrome OS, and also mobile platforms such as Windows Phone, iOS, Android and Blackberry. VMware uses the PCoIP remoting protocol to deliver high fidelity remoting experience to the user.

In addition there are a couple of other vendors offering solutions to provide a desktop or an application from the datacenter to the user. The majority of the businesses using Microsoft, Citrix or VMware.

Desktop as a Service (DaaS) is an emerging technology, where both applications and desktops are delivered from the cloud. This places additional pressure on IT to ensure that connected devices remain compliant with business policy.

Both Microsoft RDP and Citrix ICA offer Virtual Channels for some platforms allowing a developer to extend the remoting protocol with additional information. Microsoft RDP offer Virtual Channels for the Windows platform. Citrix ICA offer Virtual Channels for Windows, Linux and MAC OSX platforms.

SUMMARY OF INVENTION

This invention provides a mechanism to read the state of a device, operating system and user session as it connects to a remote desktop or application, and deliver this state to the remote desktop or application using the Virtual Channel supplied by the remoting technology such as Remote Desktop Protocol (RDP), Citrix Independent Computing Architecture (ICA) or VMware PC-over-IP (PCoIP). Further, the invention continues to monitor the state of the device, operating system and user session for as long as it is connected to the remote desktop or application, and in the event of a change of state, the updated state information is delivered to the remote desktop or application.

Virtual Channel Plugin—Some executable code that is loaded into the Remoting Client to extend the functionality of the Remoting Client and communicate with additional executable code running on the Remote Desktop or Application Server. The Virtual Channel Plugin can read the state of the Connected Device and communicate this state to the Device State Service over the Virtual Channel.

Device State Service—An application that runs on the Remote Desktop or Application Server and is loaded when the Operating System starts. The Device State Service identifies user sessions, monitors for the creation of new sessions, reads the state of the connecting device from the Virtual Channel Plugin over the Virtual Channel, persists the device state within the Windows Registry and Environment Variables, triggers Application Scripts and launches a Desktop Blocking Application to hide the Remote Desktop or Remote Application from the logged in user.

Desktop Blocking Application—An application that is launched by the Device State Service to hide the Remote Desktop or Remote Application from the logged in user, and to present a message to the user informing then why they are unable to access their Remote Desktop or Remote Application. By blocking access to the Remote Desktop or Remote Application rather than stalling it, the login process can continue ensuring that the time to login is not unnecessarily hindered.

Preferably a method for controlling the access of a device to a remote desktop or a remote application running on a remote desktop or application server using a remoting protocol, comprises the following steps:

Setting up a connection between the device and the remote desktop or application server to establish or to an existing user session, using the remoting protocol. This connection is normally established when a remoting client is started on the device and try to connect to the remote desktop or application server.

Setting up a virtual channel within the connection using the remoting protocol. The virtual channel preferably is set up by the virtual channel plug-in on the device side and on the server side by the Device State Service.

Monitoring the device to determine a device state. This also preferably is performed by the virtual channel plug-in. After that the device state is send over the virtual channel from the device to the remote desktop and application server.

Determining by the remote desktop and application server based on the received device state if an access to the remote desktop or remote application running in the user session is allowed (or the if the user session can be set up), and block the access if the access is due to the received state not allowed. The access can be blocked by an application which is activated in the user session and which hides the remote desktop or remote application from the user.

In a further embodiment the device state comprises one or more of the following information of the device:

network information such as IP, MAC, Gateway addresses, Wi-Fi Access Point. Blacklists or White lists can be used by the Device State Service to decide about the access.

network security information such as Wi-Fi Encryption and Authentication Protocols. If no or only limited security information are used or are available the access can be denied.

network performance information, such as Bandwidth and Latency. If the parameters are below a certain threshold the access can be denied.

metadata about the running Operating System, such as the name, version, service pack level. If the operation system and the service pack level do not provide a sufficient security the access is blocked or limited.

installed applications. If certain applications are installed that allow capturing of information, an access is blocked license state of installed applications or the operating system. Also the license state can be used to determine the access, for example only validly licensed products are allowed.

running applications on the device. Illegal software can be determined and an access be blocked.

geographical location or elevation; also the location can be used to determine an illegal access. For example certain geographical regions can be excluded, as well as places where information are not transmitted securely.

information if the device is jailbroken or hacked in some way that compromises the security of the device. This is used to make sure the transferred data is safe.

information about operating system updates, which have been applied to the device;

is an Anti-Virus installed and up to date;

security information of the logged in user, including their privileges, security group membership, domain membership.

All these aspects are taken alone or in combination to control the access and to decide the level of access or if a blocking is performed.

In a possible approach the information of the device state can be combined by operators to represent a Composite Connected Device State, which allows one or more of the device states to be combined into one or more composite device states by the use of logical operations, by area specifications or by conditional information. The composite device state is not different from any other device state once it has been computed, and can be used to grant or deny access to the desktop, and can be used by administrative scripts just like other device states.

The advantage to the customer is that the composite device state can better represent business policy of any user.

In a possible embodiment the received device state or composite connected device state is made available to other applications, by using one or more of the following steps:

the device state is made available within the Windows Registry;

the device state is made available within Environment Variables;

the Connected Device State is made available through an Application Programming Interface (API);

the Connected Device State is made available through an Application.

All these approaches allow an access of third party applications onto the device state, which can also decide to limit the access.

All these information preferably are provided by the virtual channel plugin running on the device, which is automatically activated when setting up a session, using the remoting protocol, setting up a virtual channel, and sending the device state over the virtual.

The device state service that is installed on the remote desktop or application server, is preferably a system service, launching when the remote desktop or application server starts up and having preferably privileged access to an operating system, being capable of communicating with the device by the virtual channel, preferably by function calls to a remote protocol services handling the remoting protocol on the server side, receiving updates of changes of the device state and controlling the access control.

The device state service that is installed on the remote desktop or application server, is preferably a system service, launching when the remote desktop or application server starts up and having preferably privileged access to an operating system. The device state service monitors the operating system for incoming remote connections, either to new or existing user sessions. The device state service establishes communication with the device by the virtual channel, preferably by function calls to a remote protocol services and handling the remoting protocol on the server side. The device state service, by communication over the virtual channel, establishes the initial device state of the connecting device, and also monitors the virtual channel to receive updates to changes to the connected device state.

In a possible embodiment the device state service launches a desktop blocking application preventing the user from viewing the Remote Desktop or Remote Application if one or more of the following conditions are fulfilled:

the device state of the device is unavailable;

insufficient to access rights for the Remote Desktop or Remote Application;

the device is a connecting device;

the device is not connected to a session;

the device state is not accepted by device state service.

In a further embodiment the Device State Service persist the device state as properties within a Windows Registry or as Environment Variables for the session, which allows other application also to use it.

In an alternative embodiment the device state service launches administrative scripts or applications when the device is connecting or connected to the remote desktop or application server, when reconnecting to an existing Session and/or upon changes to the state of the Connected Device. This allows a quick reaction on changes of the device state that can occur, for example, when the device is moving to other places. Another example, could be when the user starts uninstalling their Anti-Virus, or disabling their Firewall.

In another embodiment when the Device State Service is notified of a new Session or of a reconnect to an existing Session, then the device state service immediately launches the desktop blocking application that prevents a user from being able to view any running applications or files until the device state of the connected Device is known and sufficient for the user to access the Remote Desktop or Remote Application.

In another embodiment, the Device State Service changes an access token of the user logging onto the remote user session depending upon the state of the connected device. The access token is used by the Operating System to grant or deny access to applications, files and folders, the Windows Registry, and all other securable resources. The Device State Service adds or removes security groups, privileges or user claims from the access token depending upon the state of the connected device, thus controlling the resources accessible to the logged in user.

One example of where the invention will benefit corporate compliance, is where employees must access a sensitive Remote Application from one or more specific locations. This sensitive Remote Application may display corporate financial information, customer confidential information, or any other sensitive information. The specific locations that employees can access this sensitive Remote Application may be limited to the company offices. They may also be permitted to access the sensitive Remote Application from the home office. The IT department may choose to grant access to the Remote Application if the Connecting Device is geographically located within a specific range of each of the offices geographical coordinates. Alternatively, the IT department may choose to grant access to the sensitive Remote Application if the Connecting Device is using the corporate Wi-Fi, which may include a check on the Wi-Fi SSID, the Wi-Fi BSSID, and the address of the primary DNS server. To grant access to the home office for select users, the IT department may also configure the invention to also allow access to the sensitive Remote Application if the Connected Device is joined to one or more approved home Wi-Fi SSID, but with an additional check that the home Wi-Fi is authenticated and encrypted.

Another example of where the invention will benefit corporate compliance, is where employees are permitted to access the corporate Remote Desktop from their personal devices, with the constraint that the device must implement good security best practices. The IT department typically has little control over these employee owned corporate devices, which is a risk to the company if good security practices are not followed. For example, the IT department could choose to only grant access to the corporate Remote Desktop from a Microsoft Windows Connected Device if that device is up to date with the latest Windows Updates, has an up to date Anti-Virus, has the firewall enabled and the logged in user does not have local administrative privileges.

An extension to the above example, is where a company wants to permit access to their Remote Desktop or Remote Application environment for consultants. The IT department typically has little control over the consultant's devices, yet they are more productive using their own, familiar devices. The invention allows the IT department to enforce that the consultant is implementing good security practices.

Another example of where the invention will benefit a company is with device based licensing. Some software products are sold with a device based licensing model, permitting any user to access the software as long as they are doing so on a licensed device. The IT department could configure the invention with a list of devices that are permitted to access the software, and by comparing the Connected Device name with the contents of the list, could choose to permit access to the software.

Another example of where the invention will benefit a company is with printer mapping. Many employees expect easy access to their most local printer. In some cases, employees may be required to access a specific printer, for example in the case of a member of the financial department who must print financial documents to the finance printer to ensure they are kept private from other employees. With this invention, the IT department could define a composite connected device state named 'Printer'. If the user of the connected device is a member of the Finance security group then it could be set to the value 'Finance_Printer'. Otherwise if the employee was geographically located in OfficeA and with a geographical elevation of 20 meters, then the composite connected device state could be set to 'OfficeA_Floor3_Printer'. An administrative script could then be used to invoke an Operating System command that automatically maps the printer to the value of the composite connected device state.

DETAILED DESCRIPTION

Figure 1:
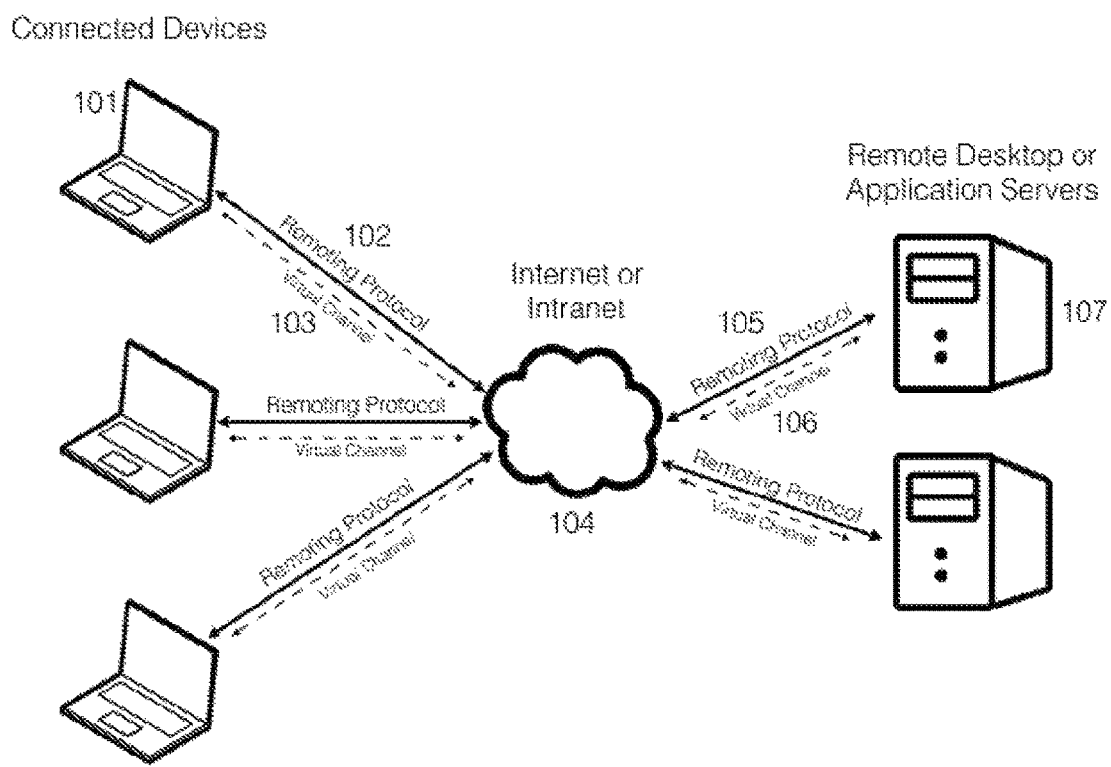
FIG. 1 shows Device connecting to a Remote Desktop or Application Server.

FIG. 1 shows a device 101 connected to a Remote Desktop or Application Server 107. The device connection is bi-directional, and is provided using a Remoting Protocol 102, which may communicate over the local intranet or the internet 104 or both, before the Remoting Protocol 105 is received by the Remote Desktop or Application Server 107. A 'gateway' server, not shown in the figures, may or may not assist in establishing the connection to the Remote Desktop or Application Servers 107. The Remoting Protocol 102, 105 provides a Virtual Channel 103, 106 which can be used to communicate between components on the Connected Device 101 and the Remote Desktop or Application Server 107.

Figure 2:
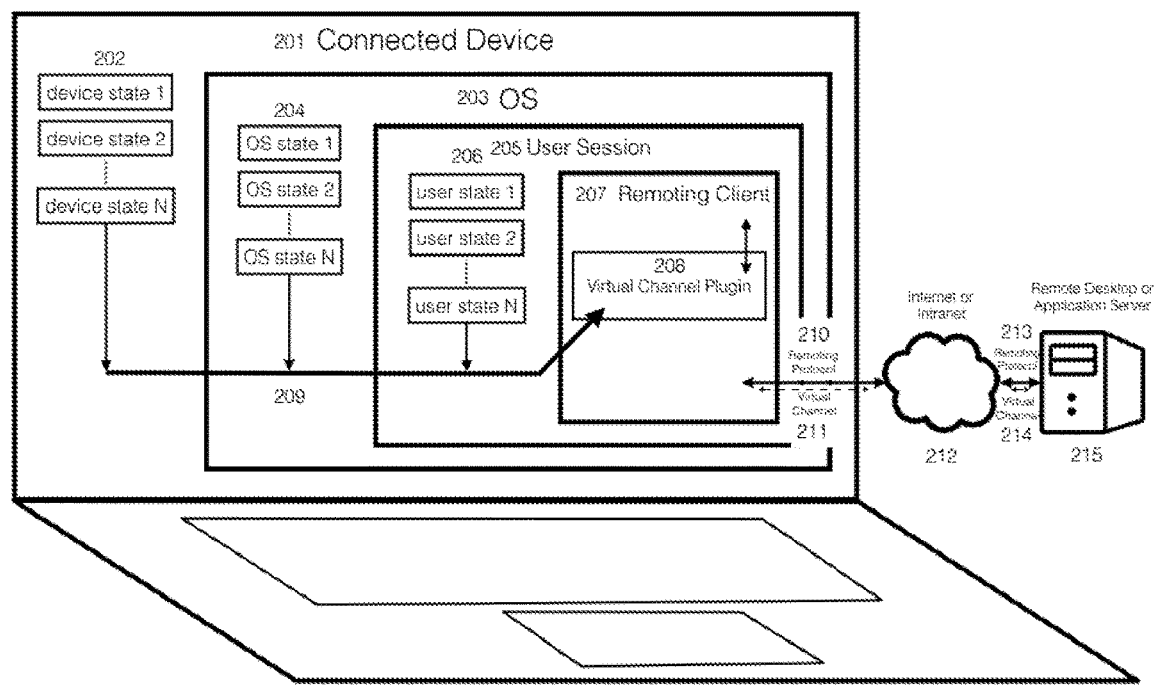
FIG. 2 shows a layer structure of a Connected Device after establishing the connection with a Remote Desktop or Application Server.

FIG. 2 shows the collection of state from a Connected Device 201. The Connected Device 201 state comprises of one or more states of the physical device 202 or components of that device, such as the speed of the processor or the amount of physical memory. The Connected Device 201 also contains an Operating System 203 which comprises of one or more states 204, such as the version number, or the installed software. The Connected Device 201 also contains a logged in User Session 205 which comprises of one or more states 206 such as the running applications, or the privileges of the logged in user.

The invention consists of a Virtual Channel Plug-in 208 that is registered with the Remoting Client 207 on installation. The Plugin is a software that can also be run as process in the background or as service. The Virtual Channel Plugin 208 is automatically loaded by the Remoting Client 207, and upon connection to a Remote Desktop or Application Server 215 will be provided with a reference to the Virtual Channel 211, 214 which can be used to communicate with the Remote Desktop or Application Server. The Virtual Channel Plugin is registered with the remote client by entries within the Windows Registry to identify it as a Virtual Channel Plugin. When the remote client establishes a connection, it loads the Virtual Channel Plugin and supplies it a pointer (e.g. the reference) to an interface that can be used to communicate with the virtual channel. The interface contains one function call to write data to the virtual channel, and another to read data from the virtual channel. The Virtual Channel Plug-in 208 contains executable code which can be used to read the state of the Connected Device 201, including the physical device state 202, the operating system state 204 and the user session state 206 and send that state over the Virtual Channel 211, 214 to software running on the Remote Desktop or Application Server 215. The transmission of the physical device state can be triggered by changes of the state or by regular intervals or if requested by the Remote Desktop or Application Server 215.

Figure 3:
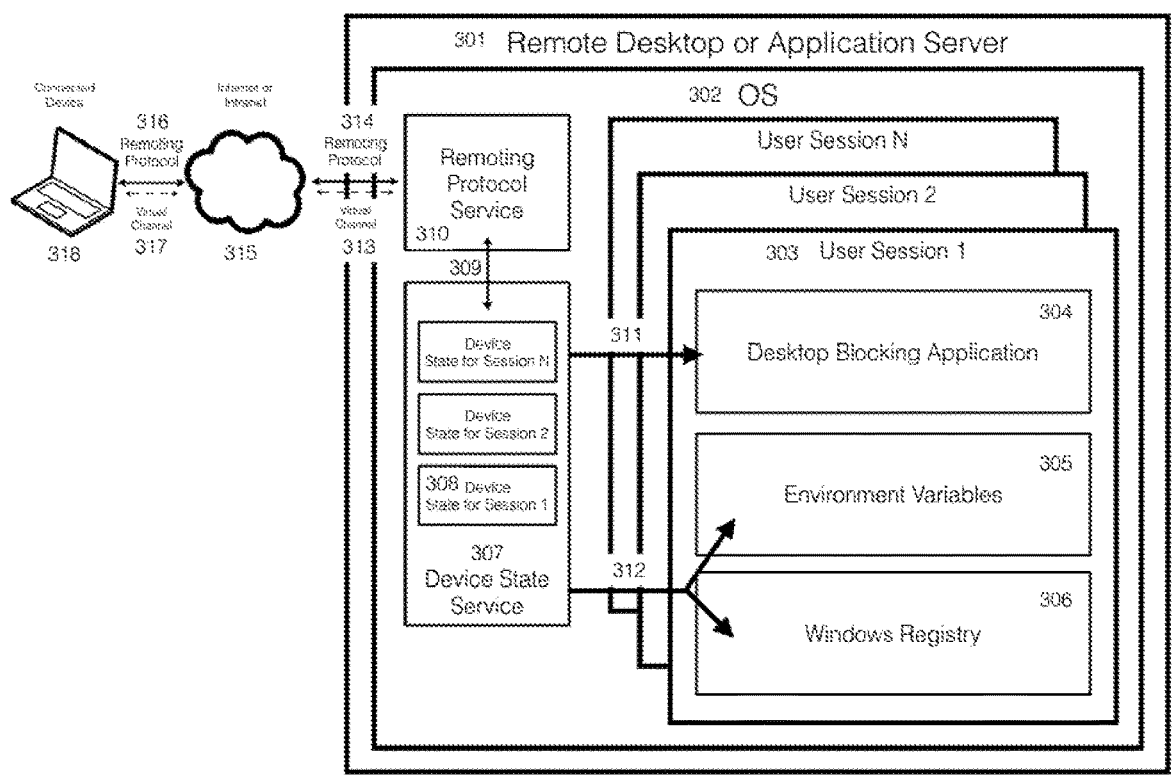
FIG. 3 shows a layer structure of a Remote Desktop or Application Server.

FIG. 3 shows the Device State Service 307 which is installed on the Remote Desktop or Application Server 301. This service is a system service, if therefore launches when the Remote Desktop or Application Server 301 starts up and has privileged access to the Operating System 302. It is capable of communicating with the Connected Device 318 by method calls to a Remoting Protocol Service 310, which is an Operating System 302 component that implements the server side of the Remoting Protocol 314.

The Device State Service 307 is able to enumerate existing User Sessions 303 and also monitor the creation of new User Sessions 303 using Operating System 302 functionality. For Microsoft RDP, the Remoting Protocol Service 310 provides this notification (see https://msdn.microsoft.com/en-us/library/aa382963(v=vs.85).aspx,), "Monitoring session connections and disconnections. For a service application, such as a virtual channel server application, to monitor session connections and disconnections, you must register it with Remote Desktop Services. To register the application with Remote Desktop Services, store the name of the virtual channel server application in the registry by adding a subkey under the following location: however it could be accomplished using a variety of techniques such as Group Policy Login scripts, the Windows Task Scheduler, or by a Winlogon Notification Package."

The Device State Service 307 is also able to detect if a User Session 303 is a remote session. This is accomplished by a function call to the Remote Protocol Services 310. This call can be different for different implementations of the Remoting Protocol 313. For Microsoft's Remote Desktop Protocol RDP, this can be a call to WTSQuerySessionInformation supplying WTS_INFO_CLASS of WTSClientProtocolType. For Citrix's Independent Computing Architecture (ICA), this can be a call to WFGetActiveProtocol.

The Device State Service 307 can communicate with the Connected Device 318 via the Virtual Channel 315 by function calls to the Remote Protocol Services 310. The invention uses this communication to read the initial state of the Connected Device 318 and also to receive updates of changes to the state of the Connected Device 318 for as long as it is connected to the Remote Desktop or Application Server (301).

The Device State Service 307 is able to launch a Desktop Blocking Application 304 which can prevent the user from viewing the Remote Desktop or Remote Application if the state of the Connecting Device (318) is unavailable, or insufficient to access the Remote Desktop or Remote Application. It is also possible that certain applications cannot be started or an access to the desktop is rejected. Also the access rights to information, files, databases, applications etc. can be changed.

The connecting device becomes a connected device is the access is granted by device state service.

The Device State Service 307 is able to persist the state of the Connected Device 18 as properties within the Windows Registry 306 or as Environment Variables 305 for the appropriate User Session 303. It could also offer an Application Programming Interface (API) providing access to the state of the Connected Device 318, it could provide an executable that returns the state, or it could persist them to a file to be read by software running on the Remote Desktop or Application Server.

The Device State Service 307 can alter the access token when a user logs onto the remote desktop or remote application. This may involve adding or removing a security group, privilege or user claim from the access token, according to the state of either the connected device or the composite device state. This results in the control of the logged in user to access the files, registry, databases, applications etc. that the user can interact with.

The Device State Service 307 can launch Administrative Scripts or Third Party Applications when the user logs into the Remote Desktop or Application Server 318, when they reconnect to an existing User Session 303 or upon changes to the state of the Connected Device 318. The scripts could map the printer based on the location of the connected device.

The scripts could map a network drive based upon the state of the connecting device.

The scripts could change the behaviour of the OS, to ensure that they can just click on files (instead of double clicking) if the device is a touch device (as opposed to a keyboard and mouse).

The scripts could call to OS functionality to allow or deny the user to view a file, such as a financial document.

The scripts could choose to offer an application to the user depending upon whether the connected device has a license for that application.

The scripts could reconfigure video playback software to present in a higher or lower quality depending upon the performance of the network between the connecting device and the remote desktop server, and depending upon the capabilities of the connecting device to render the video smoothly.

The persistence of the state of the Connected Device 318, combined with the ability to launch Administrative Scripts or Third Party Applications, allows Third Party Software, or Administrative Scripts to act on the state of the Connected Device 318 in accordance with the IT Administrators corporate policy, or to enhance the experience of the user by altering the Remote Desktop or Remote Application in a way that makes it more consumable to the Connected Device 318.

Figure 4:
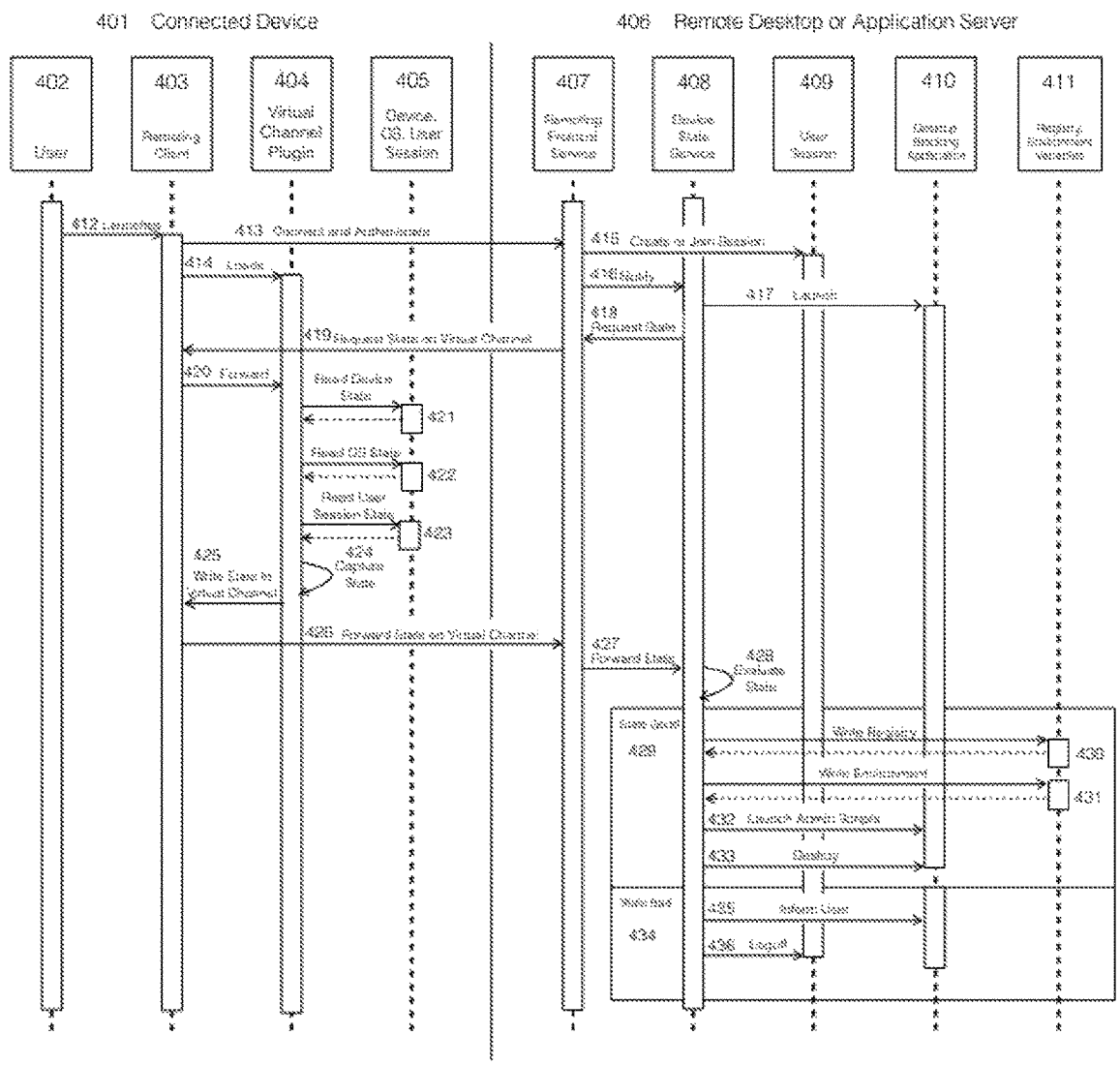
FIG. 4 shows the sequence involved in establishing a connection between a Device and a Remote Desktop or Application Server.

FIG. 4 shows the sequence of establishing a connection between the Connected Device 401 and the Remote Desktop or Application Server 406. The Connected Device 401 consists of the User 402 wishing to establish the connection using the Remoting Client 403. The Virtual Channel Plugin 404 is loaded into the Remoting Client, and can read the state of the Device, OS and User Session 405. 403 The Remote Desktop or Application Server 406 consists of the Remoting Protocol Service 407 which implements the server side or the Remoting Protocol, the Device State Service 408, the logged in User Session 408 which may already exist, the Desktop Blocking Application 410 and the Registry and Environment Variables 411.

The sequence starts when the User 402 chooses to launch 403 the Remoting Client 403. The Remoting Client 403 connects and authenticates 413 the User 402 by communicating with the Remoting Protocol Service 407 over the Intranet or Internet using the Remoting Protocol.

If the Remoting Protocol Service 407 successfully authenticates the User 402, then it chooses to either create a new session or to join an existing session 415. Either the Remoting Protocol Service 407 or functionality of the Operating System will then notify 416 the Device State Service 408 of the new User Session 409 or the reconnect to an existing User Session 409.

When the Device State Service 408 is notified of a new User Session 409 or of a reconnect to an existing User Session 409, then the Device State Service 408 immediately launches the Desktop Blocking Application 410 that prevents the User 402 from being able to view any running applications or files until the state of the Connected Device is known and sufficient for the User 402 to access the Remote Desktop or Remote Application.

The Device State Service 408 then requests the state 418 of the Connected Device by communicating over the Virtual Channel 419 by a function call to the Remoting Protocol Service 407. The Remoting Client 403 forwards 420 the Virtual Channel communication to the Virtual Channel Plug-in 404.

Upon receiving a request for state of the Connecting Device, the Virtual Channel Plugin 404 reads the state of the device 421, the OS state 422 and the user session state 423. This state is captured and stored locally 424 to be used to detect changes to the state. The state information is then written to the Virtual Channel 425 by a function call to the Remoting Client 403 which forwards the state over the Virtual Channel 426.

When the Remoting Protocol Service 407 receives the communication containing the state of the Connected Device over the Virtual Channel, it is forwarded 427 to the Device State Service 408. The Device State Service 408 then evaluates the state 428 of the Connecting Device according to a configuration. If the state of the Connecting Device is good 429, then the state is written to the Windows Registry 430 and as Environment Variables 431 for the User Session 409, 411. Any Administrative Scripts or Third Party Applications are then launched 432 allowing the Remote Desktop or Remote Application to be customized. Finally the Desktop Blocking Application 410 is closed allowing the User 402 to access their applications and data.

If the Device State Service 408 after evaluating the state 428 of the Connecting Device determines that the state is bad 434, then the Device State Service 408 calls to the Desktop Blocking Application 410 to inform the user 435 that the Connecting Device is unable to access the Remote Desktop or Remote Application. Finally, the User Session 409 is logged off 436. In an alternative embodiment only a restricted access is provided to resource based on the precise state. For example the text processing application can be started, and documents can be stored locally on the desktop but an access to emails or management system like SAP are not allowed.

Figure 5:
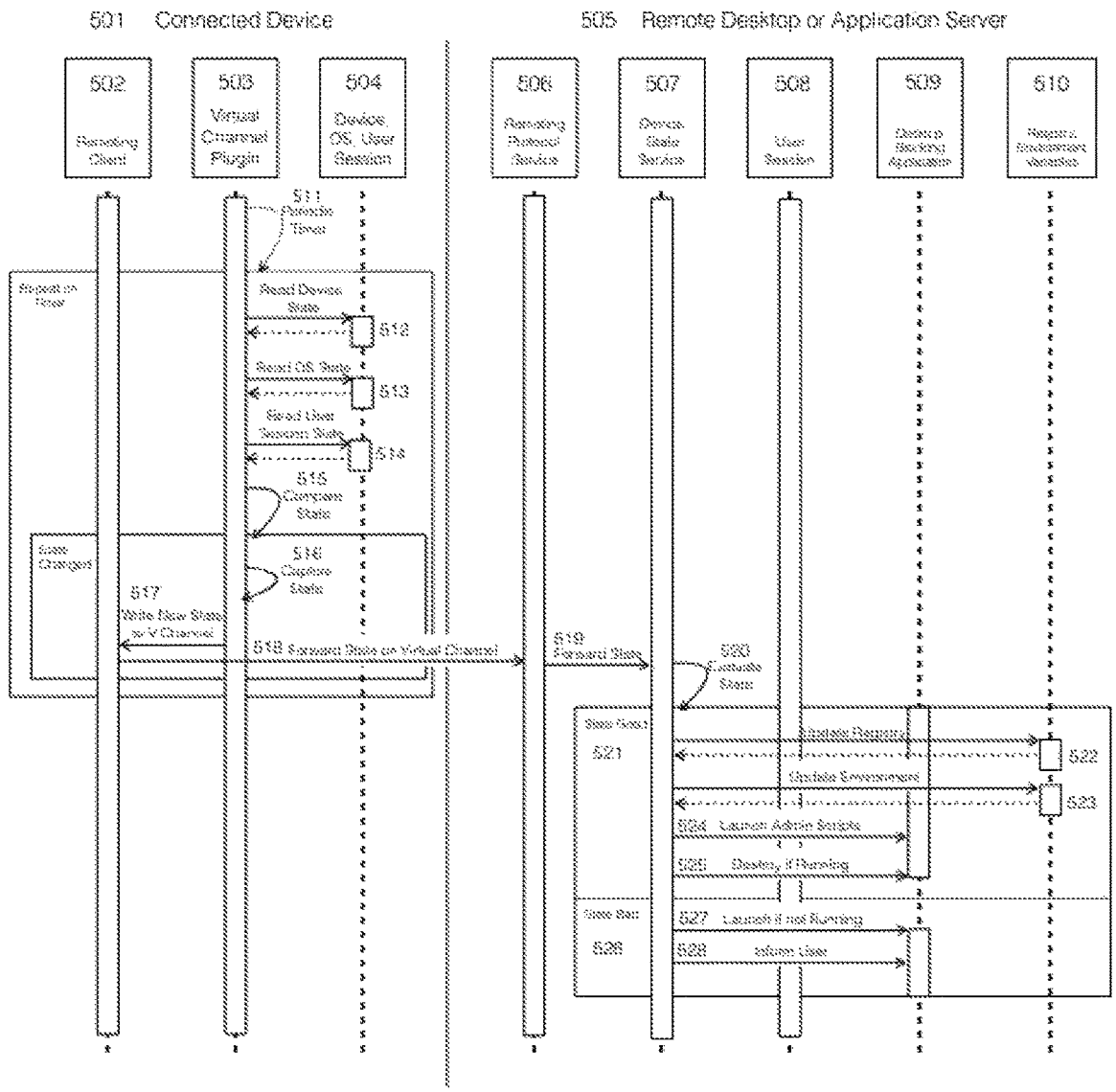
FIG. 5 show the Monitoring for changes to the Connected Device state.

FIG. 5 shows the sequence of monitoring the state of the Connected Device 501 and updating the Remote Desktop or Application Server 505 with those changes. The Connected Device 501 consists of the Remoting Client 502 which has previously connected to the Remote Desktop or Application Server 505 as described in FIG. 4. The Virtual Channel Plugin 503 was loaded into the Remoting Client 502 during connection and has previously supplied the state of the Connecting Device 501 by reading the state from the Device, OS and User Session 504. On the Remote Desktop or Application Server 505, the Remoting Protocol Service 506 implements the server side of the Remoting Protocol, and forwards Virtual Channel communications to the Device State Service 507. The Device State Service allows a central management of the rules that relate to the sessions and the states and the user. The User Session (508) was created when the user first logged in, and may or may not be showing the Desktop Blocking Application 509 depending upon the state of the Connected Device. The Device State Service 507 will have written the state of the Connected Device 501 into the Registry or Environment Variables 510.

The sequence extends FIG. 4 by a periodic timer 511 which on some arbitrary time-out will read the state of the device 512, the OS state 513 and the user session state 514. This state information is compared to the previous state of the device that may have been captured in FIG. 4, 414, or FIG. 5, 516, whichever is most recent. The new captured state is retained for next time the periodic timer 511 expires. If it is determined that the state of the device has changed, then the new state is written to the Virtual Channel 517 by a function call to the Remoting Client 502 which forwards the state over the Virtual Channel 518. The timer can also be replaced by a interrupt service, that is triggered upon hardware events.

Instead of a periodic timer 511, the Virtual Channel Plugin 503 may register with the Operating System of the Connected Device 501 to receive a notification when one or more of the state of the Connected Device 501 changes. In this circumstance, the Virtual Channel Plugin 502 would not wait for the timer before continuing the process of reading the state of the device 512, the OS state 513 and the use session state 514 before comparing the state 515 and capturing the state 516 before writing the new state to the Virtual Channel 517.

When the Remoting Protocol Service 506 receives the communication containing the new state of the Connected Device 501 over the Virtual Channel, it is forwarded 519 to the Device State Service 507. The Device State Service 507 then evaluates the new state 520 of the Connected Device 501 according to a configuration. If the state of the Connecting Device 501 is good 521, then the new state is written to the Windows Registry 522 and to the Environment Variables 523 for the logged in user. Any Administrative Scripts or Third Party Applications are then launched 524. Finally, if the Desktop Blocking Application 509 is currently being shown it is destroyed or hidden.

If the Device State Service 507 after evaluating the updated state of the Connected Device 501 determines that the state is bad 526, then if the Desktop Blocking Application 509 is not currently running it is launched 527 and finally the Device State Service 507 calls the Desktop Blocking Application 509 to present a suitable message informing the user 528 why they cannot access their Remote Desktop or Remote Application.

The Desktop Blocking Application is part of our software. It is launched within a (remote) user session and it creates a topmost window that is drawn above all other windows to hide their desktop, their applications and their files. This window presents a message such as: Connecting to DEVICENAME . . . , while the device state is determined, and either disappears if the device state is acceptable, or displays a message explaining why the device state is unacceptable for them to access their desktop.

Figure 6:
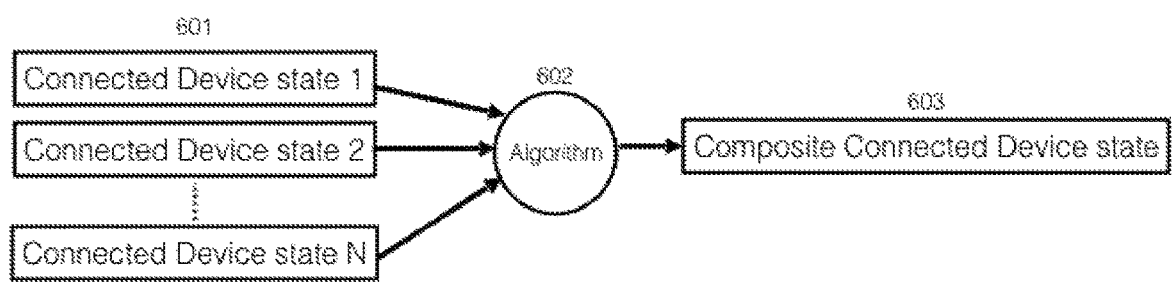
FIG. 6 Combining state of connecting device into a new state.

FIG. 6 extends the invention with the mapping of the state of the Connected Device 601 into a new Composite Connected Device state 603 using some algorithm 602. The Connected Device state 601 may be any of the states collected from the Connected Device, such as the physical device state, the OS state or the user session state. An algorithm 602 combines the states into a composite Connected Device state 603. The algorithm may be defined by the Device State Service, or may be defined by a configuration supplied by the IT department. The algorithm can for example combine multiple operations on Connected Device state 601 with Boolean logic. The operations on the Connected Device state may include operators such as equality, inequality, greater than, greater than or equals, less than, less than or equals, contains, does not contain, starts with, ends with or pattern matching. The operations on the Connected Device state may also include distance from geographical locations. An example composite Connected Device state may be a 'Connected Device Performance' state, which if the physical device's CPU speed is greater than some value, and the physical devices memory is greater than some value, and the network speed is greater than some value, then the 'Connected Device Performance' state would be 'High', else 'Low'.

Accordingly, complex logic can be used to determine the rights to a connected device The above description has not the intention to limit the scope of protection. They are only examples to explain the general principles of the invention.

What is claimed is:

1. A method for controlling the access of a device to a remote desktop or a remote application running on a remote desktop or application server using a remoting protocol, wherein the remoting protocol is used to capture graphics, audio, clipboard or storage from a remote session and deliver it to the device where it can be reconstructed to give the illusion that the remote desktop or application is running on the local device, comprising the following steps:

setting up a connection between the device and the remote desktop or application server to establish or to join an existing user session, using the remoting protocol;

setting up a virtual channel within the connection using the remoting protocol, the virtual channel provided by the remoting protocol;

monitoring the device to determine meta-data associated with the state of the device by a service or plugin running on the device, wherein the monitoring is continued for as long as the device is connected to the remote desktop or application server;

sending the meta-data associated with the state of the device, containing security relevant information, over the virtual channel to the remote desktop or application server using function calls, wherein in the event of a change in the meta-data associated with the state of the device, updated meta-data associated with the state of the device is sent over the virtual channel to the remote desktop or application server; and determining based on the received meta-data associated with the state of the device if an access to the remote desktop or remote application running in the user session is allowed, and blocking the access if the access is due to the received state not fulfilling definable security standards, wherein security information or privileges are added or removed from an access token assigned to the user logged into the remote session based on the received meta-data associated with the state of the device or a composite connected device state.

2. The method according to the claim 1, wherein the meta-data associated with the state of the device comprises one or more of the following information of the device:

network information including at least one of IP, MAC, Gateway addresses, WiFi Access Point;

network security information including at least one of WiFi Encryption and Authentication Protocols;

network performance information, including at least one of Bandwidth and Latency;

metadata about the running Operating System, including at least one of the name, version, service pack level;

installed applications;

license state of installed applications or the operating system;

running applications on the device;

geographical location or elevation;

information if the device is jailbroken or hacked in some way that compromises the security of the device;

information about operating system updates, which have been applied to the device;

is an Anti-Virus installed and up to date;

security information of the logged in user, including their privileges, security group membership, domain membership.

3. The method according to the claim 2, wherein the meta-data associated with the state of the device is combinable by operators to represent a the Composite Connected Device State, which is used to determine if access to the remote desktop or remote applications is allowed by the device.

4. The method according to claim 3, wherein the remote desktop or application server, after receiving the meta-data associated with the state of the device from the remote connected device, makes both the meta-data associated with the state of the device and/or the composite connected device state available to third party applications, by using one or more of the following steps:

the meta-data associated with the state of the device is made available within a registry of the operating system;

the meta-data associated with the state of the device is made available within Environment Variables;

the Composite Connected Device State is made available through an Application Programming Interface (API);

the Composite Connected Device State is made available through an Application.

5. The method according to claim 1, comprising a virtual channel plugin running on the device which is automatically activated when setting up a session, using the remoting protocol, setting up a virtual channel, and sending the meta-data associated with the state of the device over the virtual channel, which can also be collected by the virtual channel plug-in.

6. The method according to claim 1, comprising a device state service which is installed on the remote desktop or application server, being preferably a system service, launching when the remote desktop or application server starts up and having preferably privileged access to an operating system, being capable of communicating with the device by the virtual channel, preferably by function calls to a remote protocol services, handling the remoting protocol on the server side, receiving updates of changes of the meta-data associated with the state of the device and controlling the access control.

7. The method according to claim 6, wherein the device state service launches a desktop blocking application preventing the user from viewing the Remote Desktop or Remote Application if one or more of the following conditions are fulfilled:

the meta-data associated with the state of the device is unavailable;

insufficient to access rights for the Remote Desktop or Remote Application;

the device is a connecting device;

the device is not connected to a session; and/or the meta-data associated with the state of the device is not accepted by device state service.

8. The method according to claim 6 wherein the Device State Service
persist the meta-data associated with the state of the device as properties within a registry of the operating system or as Environment Variables for the session and/or
wherein the device state service launches administrative scripts or applications when the device is connecting or connected to the remote desktop or application server, when reconnecting to an existing Session and/or or upon changes to the state of the Connected Device.

9. The method according to claim 6, wherein when the Device State Service is notified of a new Session or of a reconnect to an existing Session, then the device state service launches the desktop blocking application which prevents a user from being able to view any running applications or files until the meta-data associated with the state of the device is known and sufficient for the user to access the Remote Desktop or Remote Application.

10. A system for controlling the access of a device to a remote desktop or a remote application running on a remote desktop or application server using a remoting protocol, wherein the remoting protocol is used to capture graphics, audio, clipboard or storage from a remote session and deliver it to a device where it can be reconstructed to give the illusion that the remote desktop or application is running on the local device, comprising:
a device with a network interface, configured to set up a connection between the device and remote desktop or application server to establish or to join an existing user session, using the remoting protocol;
the device and the remote desktop or application server are configured to set up a virtual channel within the connection using the remoting protocol, the virtual channel provided by the remoting protocol;
the device is configured to monitor and to determine meta-data associated with the state of the device, wherein the monitoring is continued for as long as the device is connected to the remote desktop or application server;
the device is configured to send the meta-data associated with the state of the device, containing security relevant information, over the virtual channel to the remote desktop or application server using function calls, wherein in the event of a change in the meta-data associated with the state of the device, an updated meta-data associated with the state of the device is sent over the virtual channel to the remote desktop or application server; and
the remote desktop or application server is configured to determine based on the received meta-data associated with the state of the device if an access to the remote desktop or remote application running in the user session is allowed, and is configured to block the access if the access is due to the received state not fulfilling definable security standards,
wherein security information or privileges are addable or removable from an access token assigned to the user logged into the remote session based on the received meta-data associated with the state of the device or a composite connected device state.

11. The system according to claim 10, wherein the meta-data associated with the state of the device comprises one or more of the following information of the device:

network information including at least one of IP, MAC, Gateway addresses, Wi-Fi Access Point;
network security information including at least one of Wi-Fi Encryption and Authentication Protocols;
network performance information, including at least one of Bandwidth and Latency;
metadata about the running Operating System, including at least one of the name, version, service pack level;
installed applications;
license state of installed applications or the operating system;
running applications on the device;
geographical location or elevation;
information if the device is jailbroken or hacked in some way that compromises the security of the device;
information about operating system updates, which have been applied to the device;
is an Anti-Virus installed and up to date;
security information of the logged in user, including their privileges, security group membership, domain membership.

12. The system according to claim 11, wherein the meta-data associated with the state of the device is combinable by operators to represent the Composite Connected Device State, the Composite Connected Device State being used to determine if access to the remote desktop or remote applications is allowed by the device.

13. The system according to claim 12, wherein the remote desktop or application server, after receiving the meta-data associated with the state of the device and/or the composite connected device state, makes both the meta-data associated with the state of the device and/or the composite connected device state available to third party applications, by using one or more of the following steps:
the meta-data associated with the state of the device is made available within a registry of the operating system;
the meta-data associated with the state of the device is made available within Environment Variables;
the Composite Connected Device State is made available through an Application Programming Interface (API);
the Composite Connected Device State is made available through an Application.

14. The system according to claim 10, comprising a virtual channel plugin running on the device to be automatically activated when setting up a session, using the remoting protocol, setting up a virtual channel, and sending the meta-data associated with the state of the device over the virtual channel, which can also be collected by the virtual channel plug-in.

15. The system according to the system claim 10, comprising a device state service being installed on the remote desktop or application server, being preferably a system service, configured to be launched when the remote desktop or application server starts up and having preferably privileged access to an operating system, being capable of communicating with the device by the virtual channel, preferably by function calls to a remote protocol services, handling the remoting protocol on the server side, receiving updates of changes of the meta-data associated with the state of the device and controlling the access control.

16. The system according to claim 15, wherein the device state service is configured to launch a desktop blocking application preventing the user from viewing the Remote Desktop or Remote Application if one or more of the following conditions are fulfilled:

the meta-data associated with the state of the device is unavailable;

insufficient to access rights for the Remote Desktop or Remote Application;

the device is a connecting device;

the device is not connected to a session;

the meta-data associated with the state of the device is not accepted by device state service.

17. The system according to claim 15 wherein the Device State Service is configured to
    persist the meta-data associated with the state of the device as properties within a registry of the operating system or as Environment Variables for the session and/or
    launch administrative scripts or applications when the device is connecting or connected to the remote desktop or application server, when reconnecting to an existing Session and/or upon changes to the state of the Connected Device.

18. The system according to claim 15, wherein when the Device State Service is notified of a new Session or of a reconnect to an existing Session, then the device state service is configured to launch the desktop blocking application which prevents a user from being able to view any running applications or files until the meta-data associated with the state of the device is known and sufficient for the user to access the Remote Desktop or Remote Application.

19. A method for controlling the access of a device to a remote desktop or a remote application running on a remote desktop or application server using a remoting protocol, wherein the remoting protocol is used to capture graphics, audio, clipboard or storage from a remote session and deliver it to the device where it can be reconstructed to give the illusion that the remote desktop or application is running on the local device, comprising the following steps:
    setting up a connection between the device and the remote desktop or application server to establish or to join an existing user session, using the remoting protocol;
    setting up a virtual channel within the connection using the remoting protocol, the virtual channel provided by the remoting protocol;
    monitoring the device to determine meta-data associated with the state of the device by a service or plugin running on the device, wherein the monitoring is continued for as long as the device is connected to the remote desktop or application server;
    sending the meta-data associated with the state of the device, containing security relevant information, over the virtual channel to the remote desktop or application server using function calls, wherein in the event of a change in the meta-data associated with the state of the device, updated meta-data associated with the state of the device is sent over the virtual channel to the remote desktop or application server; and
    determining based on the received meta-data associated with the state of the device if an access to the remote desktop or remote application running in the user session is allowed, and blocking the access if the access is due to the received state not fulfilling definable security standards,
wherein the meta-data associated with the state of the device comprises one or more of the following information of the device:
    network information including at least one of IP, MAC, Gateway addresses, WiFi Access Point;
    network security information including at least one of WiFi Encryption and Authentication Protocols;
    network performance information, including at least one of Bandwidth and Latency;
    metadata about the running Operating System, including at least one of the name, version, service pack level;
    installed applications;
    license state of installed applications or the operating system;
    running applications on the device;
    geographical location or elevation;
    information if the device is jailbroken or hacked in some way that compromises the security of the device;
    information about operating system updates, which have been applied to the device;
    is an Anti-Virus installed and up to date;
    security information of the logged in user, including their privileges, security group membership, domain membership,
the meta-data associated with the state of the device being combinable by operators to represent a Composite Connected Device State, which is used to determine if access to the remote desktop or remote applications is allowed by the device.

20. A system for controlling the access of a device to a remote desktop or a remote application running on a remote desktop or application server using a remoting protocol, wherein the remoting protocol is used to capture graphics, audio, clipboard or storage from a remote session and deliver it to a device where it can be reconstructed to give the illusion that the remote desktop or application is running on the local device, comprising:
    a device with a network interface, configured to set up a connection between the device and remote desktop or application server to establish or to join an existing user session, using the remoting protocol;
    the device and the remote desktop or application server are configured to set up a virtual channel within the connection using the remoting protocol, the virtual channel provided by the remoting protocol;
    the device is configured to monitor and to determine meta-data associated with the state of the device, wherein the monitoring is continued for as long as the device is connected to the remote desktop or application server;
    the device is configured to send the meta-data associated with the state of the device, containing security relevant information, over the virtual channel to the remote desktop or application server using function calls, wherein in the event of a change in the meta-data associated with the state of the device, an updated meta-data associated with the state of the device is sent over the virtual channel to the remote desktop or application server; and
    the remote desktop or application server is configured to determine based on the received meta-data associated with the state of the device if an access to the remote desktop or remote application running in the user session is allowed, and is configured to block the access if the access is due to the received state not fulfilling definable security standards,
wherein the meta-data associated with the state of the device comprises one or more of the following information of the device:
    network information including at least one of IP, MAC, Gateway addresses, Wi-Fi Access Point;
    network security information including at least one of Wi-Fi Encryption and Authentication Protocols;

network performance information, including at least one of Bandwidth and Latency;
metadata about the running Operating System, including at least one of the name, version, service pack level;
installed applications;
license state of installed applications or the operating system;
running applications on the device;
geographical location or elevation;
information if the device is jailbroken or hacked in some way that compromises the security of the device;
information about operating system updates, which have been applied to the device;
is an Anti-Virus installed and up to date;
security information of the logged in user, including their privileges, security group membership, domain membership,
the meta-data associated with the state of the device being combinable by operators to represent a Composite Connected Device State, the Composite Connected Device State being used to determine if access to the remote desktop or remote applications is allowed by the device.

* * * * *